Feb. 7, 1950
C. P. WILLIAMS
2,496,572
MECHANICAL TRANSMISSION
Filed Aug. 30, 1945
2 Sheets-Sheet 1
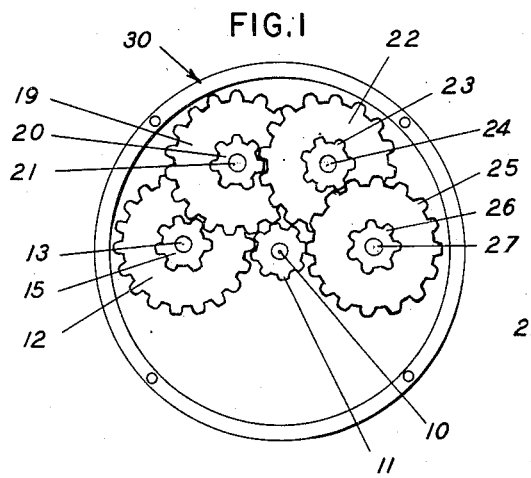
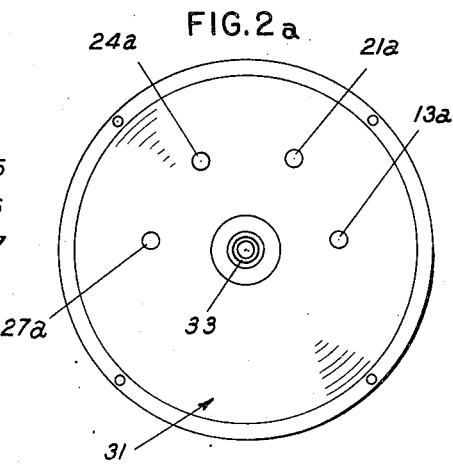
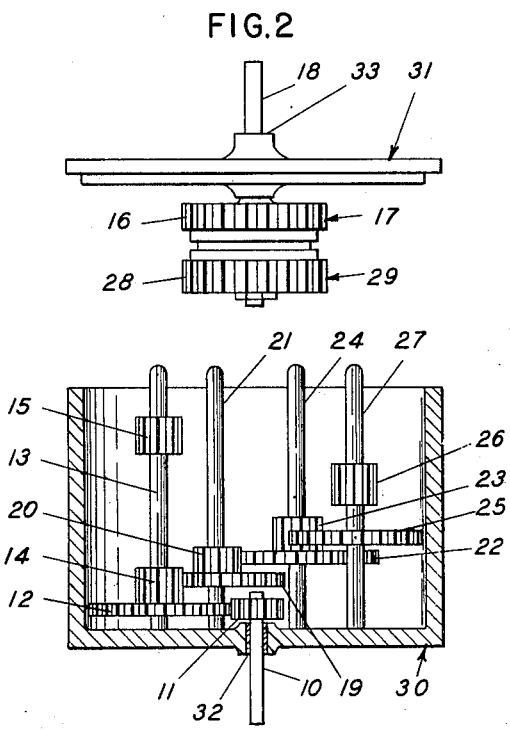
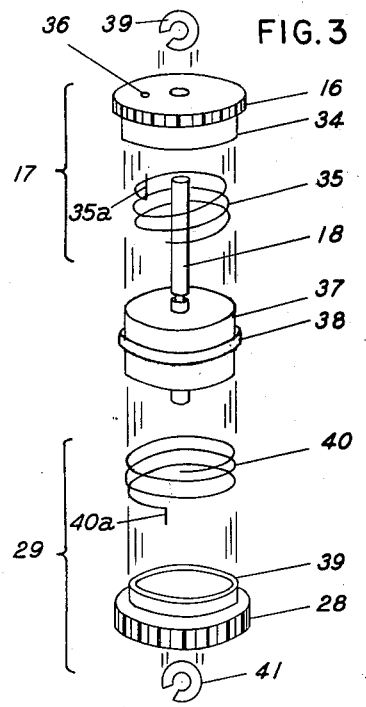
INVENTOR
CHESTER P. WILLIAMS
BY
William D. Hall.
ATTORNEY Feb. 7, 1950 C. P. WILLIAMS 2,496,572
MECHANICAL TRANSMISSION
Filed Aug. 30, 1945 2 Sheets-Sheet 2

INVENTOR
CHESTER P. WILLIAMS
BY
ATTORNEY

Patented Feb. 7, 1950

2,496,572

UNITED STATES PATENT OFFICE 2,496,572

MECHANICAL TRANSMISSION

Chester P. Williams, Waltham, Mass., assignor to the United States of America as represented by the Secretary of War Application August 30, 1945, Serial No. 613,613

5 Claims. (Cl. 74—812)

This invention relates in general to the transmission of mechanical energy. More particularly it relates to a combination of an automatic clutch mechanism and two trains of gears by which two ratios of speed reduction, or increase, may be accomplished solely by reversing the direction of rotation of the driving mechanism.

It is frequently desirable in using power from a single speed device, such as synchronous or other type of constant speed electric motor to have available two speeds for the driven shaft.

It is an object of the present invention to provide a novel and unique combination whereby a shaft is driven at two different predetermined speeds by a constant speed prime mover in which the change of speeds is caused by reversing the direction of rotation of the prime mover without reversing the direction of the rotation of the driven shaft. Such an arrangement dispenses with bulky mechanical gear shifting mechanism which is replaced merely by electrical connections from a reversing switch to a reversible electric motor.

Other objects, features and advantages of this invention will suggest themselves to those skilled in the art and will become apparent from the following description of the invention taken in connection with the accompanying drawings in which:

Fig. 1 is a plan view of the gear casing of a preferred embodiment with the top cover removed.

Fig. 2 is an elevation partly in section of said embodiment of the invention;

Fig. 2a is a bottom view of the top cover of the gear casing;

Fig. 3 is an exploded view showing the arrangement and assembly of the automatic clutch mechanism.

Figure 4:
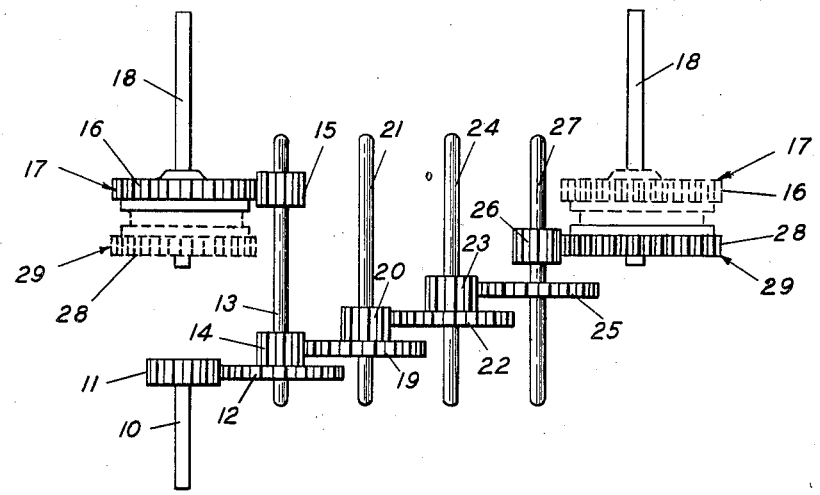
Fig. 4 is a schematic representation showing the arrangement and operation of a device embodying the principles of the invention.

Referring more specifically to the drawings, driver shaft 10 is driven by any source of mechanical power preferably a constant speed reversible electric motor. Gear 11 is keyed on shaft 10 and engages at all times gear 12 keyed on shaft 13. Also keyed on shaft 13 are gears 14 and 15 each preferably having the same number of teeth. The drive for one mode of operation is completed from gear 15 to gear 16 on automatic clutch 17 mounted on driven shaft 18.

A second mode of operation is completed from gear 14 through gears 19 and 20 both keyed on shaft 21, gears 22 and 23 keyed on shaft 24, gears 25 and 26 keyed on shaft 27, and gear 28 on automatic clutch 29 mounted on driven shaft 18.

For the purpose of compactness and in order that the axes of driven shaft 18 and of driver shaft 10 will be along the same line the gear trains are arranged so that the axes of their shafts 13, 21, 24, and 27 are parallel to the axes of shafts 10 and 18 and are in a circular arrangement around those axes, as is more clearly shown in Figs. 1, 2 and 2a. Preferably all the gears and the automatic clutches 17 and 29 are mounted in and enclosed by a cylindrical gear casing 30 and top cover 31 provided respectively with suitably designed bearings 32 and 33 for shafts 10 and 18 respectively and bearings 13a, 21a, 24a, and 27a in top cover 31 respectively for shafts 13, 21, 24 and 27. Similar end bearings for these shafts are provided in the bottom wall of casing 30, but, since they are of conventional design, are not shown in the drawings.

Automatic clutches 17 and 29 are so arranged that they can impart rotation to shaft 18 in only one direction of rotation regardless of the direction of rotation of gears 16 and 28 which form parts of said clutches. By reference to Fig. 3 which is an exploded view of the elements of the automatic clutch mechanism, the arrangement of parts to accomplish this result may be readily understood. Integral with gear 16 is a portion 34 of reduced diameter. Portion 34 is hollow and has fixed within it coil spring 35. The end 35a of spring 35 fits in hole 36 in gear 16 and is securely fastened at that point. There is also mounted on shaft 18 a drum member 37 having a diameter small enough to fit within the coil formed by spring 35, but not much less than inner diameter of spring 35 when it is in its normal position. Cylindrical member 37 is longitudinally divided by collar 38. Automatic clutch 17 is assembled so that reduced portion 34 fits over a portion of drum 37 with spring 35 in the annular space between the two with the end of reduced section 34 and spring 35 abutting against collar 38. This assembly is held in position by lock washer 39 or other suitable means. Clutch 29 is adapted to drive shaft 18 in the same direction that it is driven by clutch 17. This mechanism comprises elements similar to those of clutch 17. Gear 28 has a portion 39 of reduced diameter. Spring 40 generally similar to spring 35 has an end 40a for attachment to gear 28. Reduced portion 39 is adapted to fit over the other end of drum 37 and it and spring 40 abut against one side of collar 38 in a manner similar to that that reduced portion 34 and spring 35 abut against the other side of collar 38.

Before proceeding to an explanation of the mode of operation of the entire mechanism, there will now be explained the method of operation of the automatic clutch mechanism. For the purpose of explanation the case may be considered where the apparatus is designed to drive driven shaft 18 in a counterclockwise direction and the gear 15 in mesh with gear 16 drives that gear 16 in the same direction. Under this condition, due to the fact that spring 35 is firmly secured to gear 16, it will tend to wind up, that is, decrease its internal diameter, and will thus bind against drum 37. Since drum 37 is keyed to shaft 18, shaft 18 will be driven in a counterclockwise direction. At the same time the other gear train, as will be shown hereinbelow drives gear 28 in a clockwise direction. This has the effect of unwinding spring 40, that is, of increasing its internal diameter. Thus drum 37 is not bound by spring 40 and there is no tendency for that spring to exert any torque on drum 37 or shaft 18.

As will be more fully understood from the above description, when the rotation of driver shaft 10 is reversed gear 28 is rotated in a counterclockwise direction and gear 16 is rotated in a clockwise direction. When this condition exists, spring 40 is wound up exerting pressure on drum 37 thereby imparting counterclockwise rotation to shaft 18, whereas spring 35 tends to unwind allowing cylindrical member 37 to rotate freely within its coil.

The operation of a device employing the principle of the present invention may readily be understood by reference to Fig. 4 which is a schematic representation showing the combination of the two gear trains with the active portions of the automatic clutch mechanism shown in solid lines in their operating positions and with the idle portions in broken lines. Again considering the device to be designed for counterclockwise rotation of the driven shaft 18 and considering shaft 10 to be rotating in a clockwise direction, gear 11 drives gears 12, 14, and 15 in a counterclockwise direction and in turn gear 16 is driven in a clockwise direction. As previously explained, this will cause clutch 17 to slip around drum 37 without imparting any torque to shaft 18. However, if the rotation of shaft 10 is reversed so that it rotates in a counterclockwise direction the direction of rotation of gears 12, 14, 15 and 16 will be reversed with the result that gear 16 will rotate in a counterclockwise direction and spring 35 will grip drum 37 thus driving shaft 18. Returning to the first condition, that is that shaft 10 is rotating in a clockwise direction and following the other train of gears, it is seen that gear 14 drives gears 19 and 20 in a clockwise direction. Gear 20 drives gears 22 and 23 in a counterclockwise direction and gear 23 drives gears 25 and 26 in a clockwise direction. Gear 26 meshes with gear 28 on clutch 29 and drives it in a counterclockwise direction, thereby imparting a counterclockwise torque to shaft 18. If the rotation of shaft 10 is reversed so that its rotation is in a counterclockwise direction, the direction of rotation of all the gears in this train will be reversed and gear 28 will rotate in a clockwise direction causing automatic clutch 20 to slip due to the unwinding of spring 40.

In the embodiment shown in the drawings, when the prime mover causes driver shaft 10 to rotate in a counterclockwise direction, the drive to shaft 18 is completed in a counterclockwise direction through clutch 17. When the prime mover drives shaft 10 is a clockwise direction, the drive to shaft 18 causing it to rotate in a counterclockwise direction is completed through clutch 29.

In the embodiment shown both gear trains are step down or speed reductions and, since it is desired to get two different ratios of speed reduction, the various gears comprising the two trains are chosen to give the desired ratios. It is to be understood that arrangements in which step up or increased speed ratios are obtained form mere modifications of the embodiment shown and fall within the principles of this invention. The essential feature of the portion of this invention comprising the gear trains is to have an even number of gears in one train and an odd number of gears in another or any equivalent arrangement that will result in different ultimate direction of rotation.

From the above description, it is apparent that devices embodying the principle of the present invention provide means for altering the speed of a driven shaft which requires only the electrical connections necessary to cause a reversal in the direction of the electric motor. It is also apparent that such electrical connections can be completed through long cables and that, therefore, selection of speeds can be achieved from a remote point by merely operating a switch.

While there has been here described what is at present considered to be the preferred embodiment of the invention, it will be obvious to those skilled in the art that various changes and modifications may be made therein without departing from the scope of the invention.

What is claimed is:

1. In apparatus for transmitting mechanical energy the combination of a reversible prime mover, a driver shaft, a driven shaft coaxial with said driver shaft, a first train of speed changing gears driven by said driver shaft, a second train of speed changing gears driven by said driver shaft and having a gear ratio differing from that of said first train, said gears being positioned substantially in an arc about the axis of said driver shaft, and an automatic clutch mechanism, in which combination the gears of said first train drive a first element of said automatic clutch mechanism in the same direction of rotation as that of the prime mover and the gears of said second train drive a second element of said automatic clutch mechanism in the opposite direction of rotation to that of the prime mover and in which one of said clutch elements engages and drives said driven shaft while the other clutch element is disengaged from said driven shaft and allows free rotation of said driven shaft in the direction imparted by said first element and in which, upon reversal of the direction of rotation of said prime mover, said clutch element engaged with said driven shaft before reversal becomes disengaged therefrom and said clutch element disengaged from said driven shaft before reversal becomes engaged with and drives said driven shaft, whereby the direction of rotation of the driven shaft is the same regardless of the direction of rotation of the prime mover and the driver shaft.

2. In apparatus for transmission of mechanical energy, the combination of a reversible prime mover, two gear trains having different gear ratios between a driver shaft and a driven shaft having a mutual axis, the number of gear elements in one of said trains being an even number and in the other train being an odd number, said gear trains being positioned substantially in an arc about said axis, and an automatic clutch mechanism disposed about said driven shaft and including two clutches both of which engage said driven shaft to impart rotation to it in only one and in the same direction.

3. In apparatus for the transmission of mechanical energy, the combination of a reversible prime mover, a reversible driver shaft coupled to said prime mover, a driven shaft coaxial with said driver shaft, gear trains having different gear ratios and being actuated by said driver shaft, and an automatic clutch device having two clutch elements, said gear trains being disposed substantially in an arc about the axis of said driver shaft and including one train to drive one element of said clutch device in one direction of rotation and another train to simultaneously drive a second element of said clutch device in an opposite direction of rotation when the driver shaft is rotated in a first direction of rotation and to drive said clutch elements respectively in directions opposite to those just mentioned when the driver shaft is rotated in a second direction of rotation, each of said elements when driven in one direction imparting rotation in said direction to said driven shaft and when driven in the opposite direction permitting simultaneous free rotation of said driven shaft in the direction opposite to that of said element.

4. In a mechanical transmission means, a driver shaft rotatable in clockwise and counterclockwise directions, two gear train means coupled to said driver shaft and positioned substantially in an arc about the axis of said driver shaft, two clutch means rotatable respectively by said gear train means, a driven shaft coaxial with said driver shaft and engageable by both of said clutch means, the two gear train means being such that when the driver shaft is rotated in a clockwise direction the two clutch means are rotated in directions opposite to each other and when the driver shaft is rotated in a counterclockwise direction the two clutch means respectively are rotated in directions opposite to those just described and also opposite to each other, each clutch means operably engaging the driven shaft only when rotating in a clockwise direction.

5. In a mechanical transmission means a cylindrical housing, a driver shaft extending axially through one end of said housing, a driven shaft extending axially through the other end of said housing, two clutch means associated with said driven shaft, each of said clutch means being adapted to engage the driven shaft and rotate it when said clutch means is rotated in one direction and to rotate freely relative to said driven shaft when said clutch means is rotated in the other direction, the engaging direction of both clutch means being the same, gear train means between the driver shaft and one clutch means, second gear train means between the driver shaft and the other clutch means, said gear train means being disposed within said housing and substantially in an arc about its axis and being adapted to rotate the clutch means in directions opposite to each other when the driver shaft is rotated in one direction and to rotate the clutch means respectively in reversed directions when said driver shaft is rotated in the opposite direction.

CHESTER P. WILLIAMS.

REFERENCES CITED

The following references are of record in the file of this patent:

UNITED STATES PATENTS

| Number | Name | Date |
| --- | --- | --- |
| 353,797 | Marshall | Dec. 7, 1886 |
| 736,564 | Stollewerk | Aug. 10, 1903 |
| 2,275,246 | Caldwell | Mar. 3, 1942 |